United States Patent [19]
Patterson

[11] 3,892,625
[45] July 1, 1975

[54] RADIAL BLANKET ASSEMBLY ORIFICING ARRANGEMENT

[75] Inventor: John F. Patterson, Richland, Wash.

[73] Assignee: The United States of America as represented by the United States Energy Research and Development Administration, Washington, D.C.

[22] Filed: Oct. 12, 1973

[21] Appl. No.: 406,519

[52] U.S. Cl. .................................. 176/50; 176/61
[51] Int. Cl.² ........................................ G21C 15/04
[58] Field of Search ........................ 176/61, 50, 43

[56] References Cited
UNITED STATES PATENTS

| | | | |
|---|---|---|---|
| 3,119,746 | 1/1964 | Lemesle et al. | 176/50 |
| 3,200,045 | 8/1965 | Vendryes et al. | 176/61 |
| 3,305,449 | 2/1967 | Furgerson | 176/50 |
| 3,383,287 | 5/1968 | Jackson | 176/50 |
| 3,501,377 | 3/1970 | Germer | 176/50 |
| 3,619,367 | 11/1971 | Gumuchian | 176/61 |
| 3,736,226 | 5/1973 | Sakurama | 176/50 |
| 3,763,886 | 10/1973 | Lambert | 176/61 |

OTHER PUBLICATIONS

Patterson, Def. Pub. of Serial No. 262,434, filed 6/13/72, published in 909 O.G. 795 on 4/17/73, Defensive Publication No. T909,019.

*Primary Examiner*—Harvey E. Behrend
*Attorney, Agent, or Firm*—John A. Horan; Leonard Belkin; Cornell D. Cornish

[57] ABSTRACT

Apparatus and method for easily varying the flow and position of flowing metal coolant streams in a liquid metal fast breeder reactor vessel so as to match the coolant flow with the coolant requirements of the reactor as the reactor ages. To this end, radial streams and orifice assemblies are selectively added and positioned as desired for selectively increasing the radial flow of portions of the flowing liquid metal into radial blanket fuel assemblies that are shuffled from one place to another, thus to match the coolant flow with the coolant requirements of the radial blanket fuel assemblies. This is accomplished by selectively adding restraint assemblies having throttling means and holes for diverting radially a portion of the flowing liquid metal into an annular fluid portion that is received and transported by identical selectively shuffleable radial blanket fuel assemblies as the power in the radial blanket increases with operating time.

5 Claims, 4 Drawing Figures

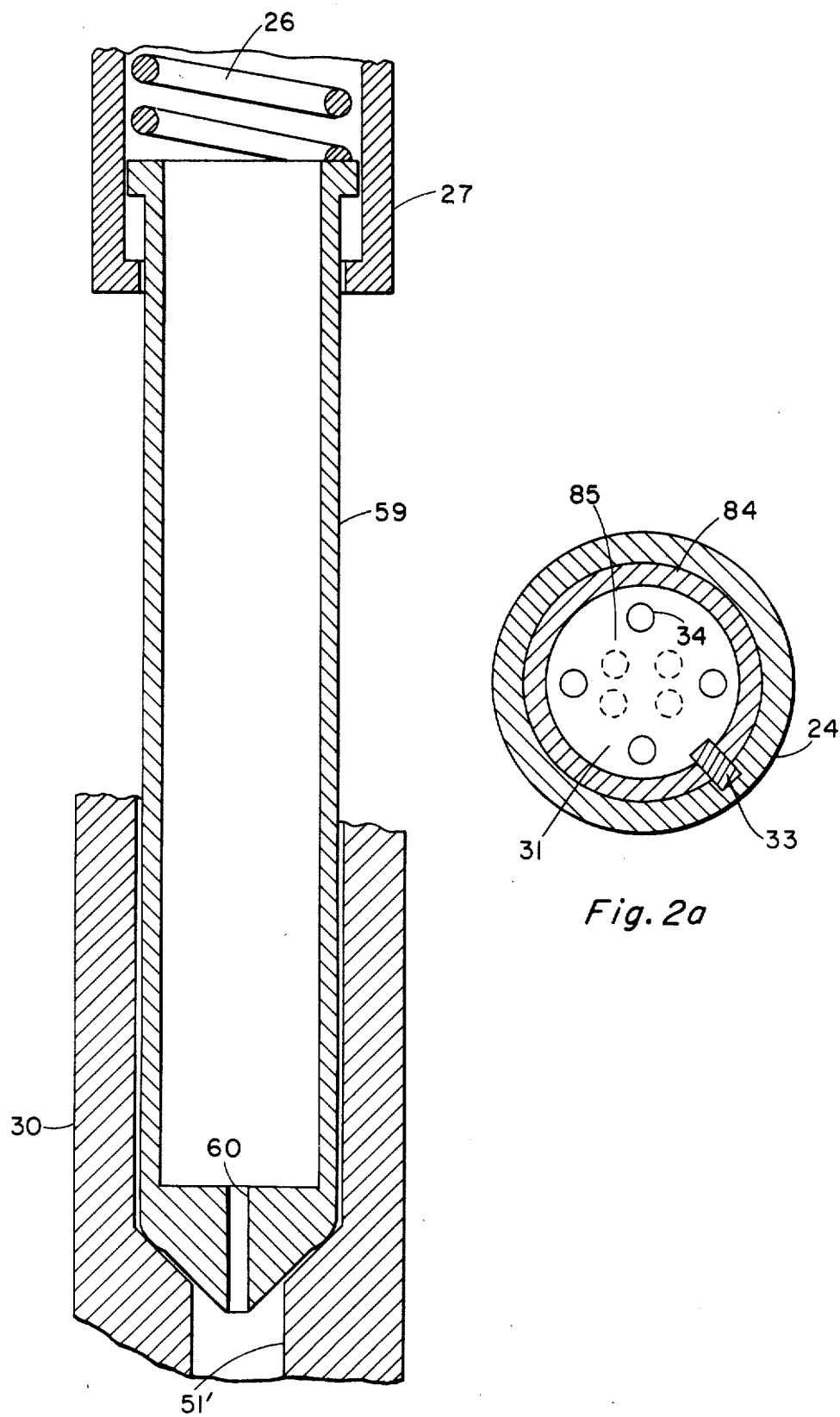
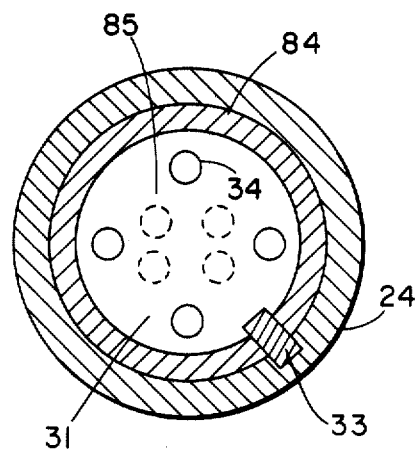
Fig. 2a
Fig. 3

3,892,625

RADIAL BLANKET ASSEMBLY ORIFICING ARRANGEMENT

SOURCE OF THE INVENTION

This invention was made in the course of, or under a contract with the United States Atomic Energy Commission.

BACKGROUND OF THE INVENTION

In a liquid metal cooled nuclear reactor using enclosed fuel in radial blanket fuel assemblies, the coolant upon entering one end of each assembly travels the complete length of the assemblies, and the coolant from each assembly does not mix until leaving the respective assemblies. Due to the large variation in the power generation rates extending from the assemblies in the center of the reacter core to those in the periphery of the core, the coolant temperatures vary accordingly. As is understood by those skilled in the art in practice, the power production in the individual radial blanket fuel assemblies can vary by a factor of three or more from location to location, depending on their distance from the center of the reactor core. Also, the fraction of the total reactor power produced in the radial blanket region can increase as a function of operating time, and this can increase by another factor of 3 or 4 over the reactor lifetime, depending on the size and arrangement of the reactor components.

As a consequence of the variation in power production, it is advantageous to match the coolant flow with the power produced in the respective individual radial blanket fuel assemblies at a given point in time. If the power and coolant flow cannot be matched in an individual assembly, the assembly must be overcooled.

Significant overcooling of these assemblies has several deleterious effects. For example, this overcooling degrades the mixed mean outlet temperature of the reactor coolant, thus reducing the efficiency of the plant. Also, significant temperature gradients can develop between the fuel assemblies causing high stresses and unpredictable effects on the core restraint system. Moreover, large differences in the outlet coolant temperatures between adjacent assemblies can cause rapidly fluctuating temperatures in the reactor structures, which can give rise to thermal fatigue failures.

Another aspect arises out of the fact that, as a consequence of the above-mentioned non-uniform heating in the radial blanket fuel assemblies, severe wall-to-wall temperature variations can occur in the radial blanket fuel assemblies, particularly those located in the peripheral parts of the core and the entire blanket region. Because of the relatively low amount of mixing that takes place within an assembly, temperature differences within a particular assembly may be as much as 100° F and above and they are not greatly reduced in the length of the assembly above the fuel area. These temperature profiles are maintained within the assemblies all the way to the outlet nozzles. The differential thermal expansion resulting from the application of wall-to-wall temperature difference of this magnitude in a core assembly causes the latter to bow toward the hot side of the assembly and can produce unnecessarily high contact loads between adjacent assemblies.

Still another aspect arises out of the fact that lower flow rates in blanket assemblies as compared with the core assemblies results in a much lower pressure drop in the blanket region than in the core region. This requires that the blanket region be heavily orificed. Such orificing is difficult to achieve if it is incorporated in a single stage in individual assemblies.

SUMMARY OF THE INVENTION

The present invention overcomes or reduces the aforementioned difficulties, by providing means for variably matching the flow and position of the coolant with the respective cooling requirements of the radial blanket fuel assemblies, so as to prevent severe overcooling of these radial blanket assemblies both as to position and flow.

More particularly, this invention provides selectively insertable inlet means for matching the flow and position of the coolant with shuffleable radial blanket fuel assemblies. To this end, each selectively added inlet means splits the coolant flow into an axially flowing portion and an annular fluid portion that is received and transported by identical shuffleable radial blanket fuel assemblies. Also, each inlet means is easily and selectively added to vary the flow and its position to selected of the radial blanket assemblies, so as to match the coolant flow with respective of the radial blanket fuel assemblies as the power in the radial blanket increases with operating lifetime.

In one embodiment selectively insertable restraint assemblies having throttling means and holes are selectively positioned and added to increase the radial flow and control the position of this radial flow with respect to specific reactor zones containing groups of shuffleable radial blanket fuel assemblies. To this end, the reactor has a vessel that is divided into high and low pressure regions having main liquid metal coolant streams flowing therebetween. Inside the vessel are reactor zones having cylindrical chambers forming a plurality of selectively insertable upstream inlets for at least a portion of the main streams, and the restraint assemblies are selectively inserted and positioned in the chambers relative to specific shuffleable radial blanket assemblies for diverting radially a portion of the flowing liquid metal fluid toward the periphery of respective of the streams so as to separate the streams into axially flowing fluid stream portions, and annular fluid stream portions that are received and transported axially in parallel with respective shuffleable radial blanket fuel assemblies in respective of the reactor zones.

It is a principal object of this invention, therefore, selectively, periodically to provide an improved distribution of the coolant through specific zones of a liquid metal cooled fast breeder reactor during the operating lifetime of the reactor.

The above and further novel features and objects of this invention will become apparent from the following detailed description of one embodiment when the same is read in connection with the accompanying drawings, and the novel features will be particularly pointed out in the appended claims.

BRIEF DESCRIPTION OF THE DRAWINGS

In the drawings, where like elements are referenced alike:

FIG. 2a is a detail of the apparatus of FIG. 1 showing one arrangement of the orifices of the annular discs thereof;

FIG. 3 is a partial cross section of a plug that is removed and replaced by restraint assembly of FIG. 1.

DETAILED DESCRIPTION OF A PREFERRED EMBODIMENT

Figure 1:
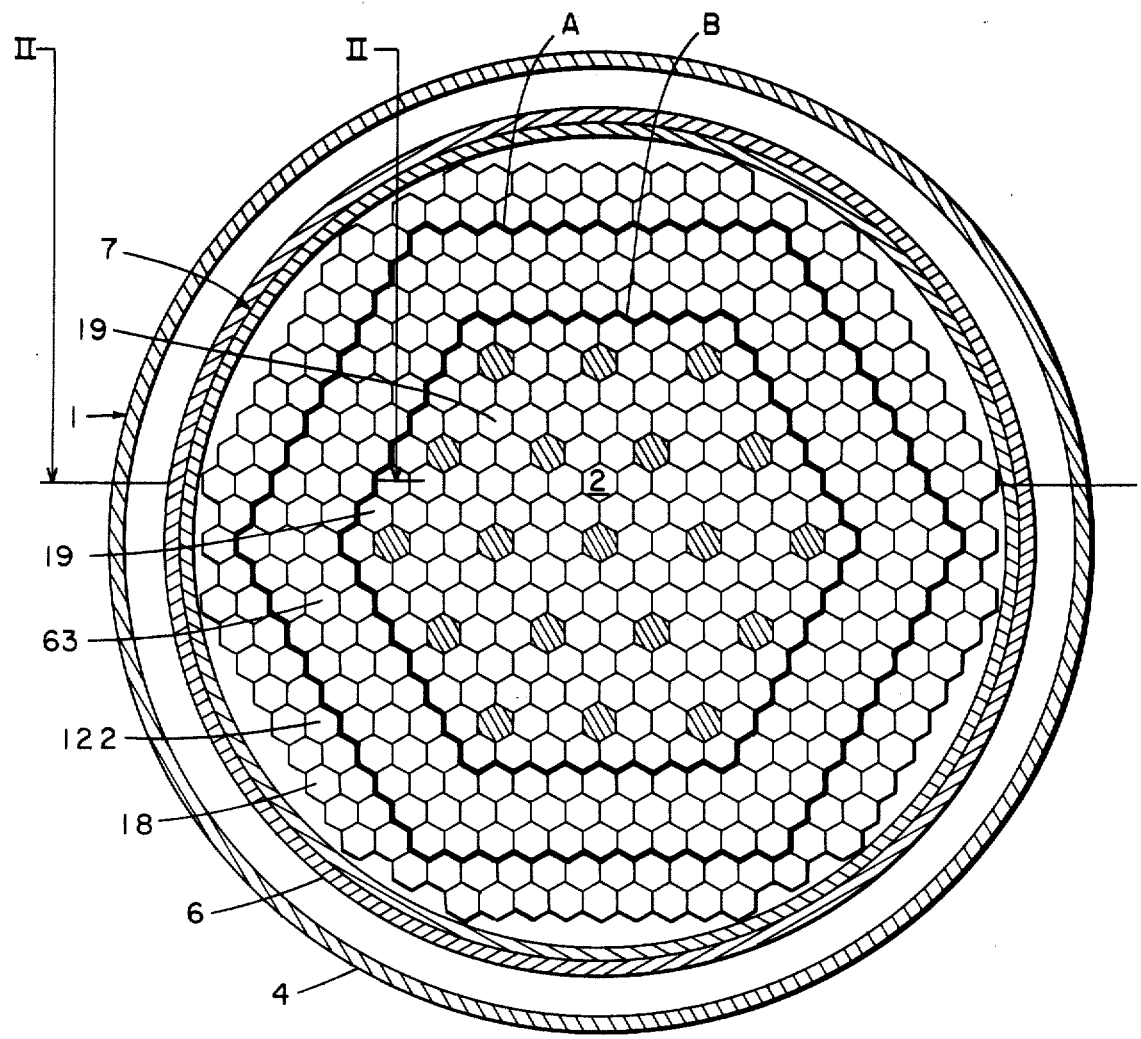
FIG. 1 is a schematic view taken through a liquid metal fueled breeder reactor to show the arrangement and positioning of various of the elements of the reactor.
Figure 2:
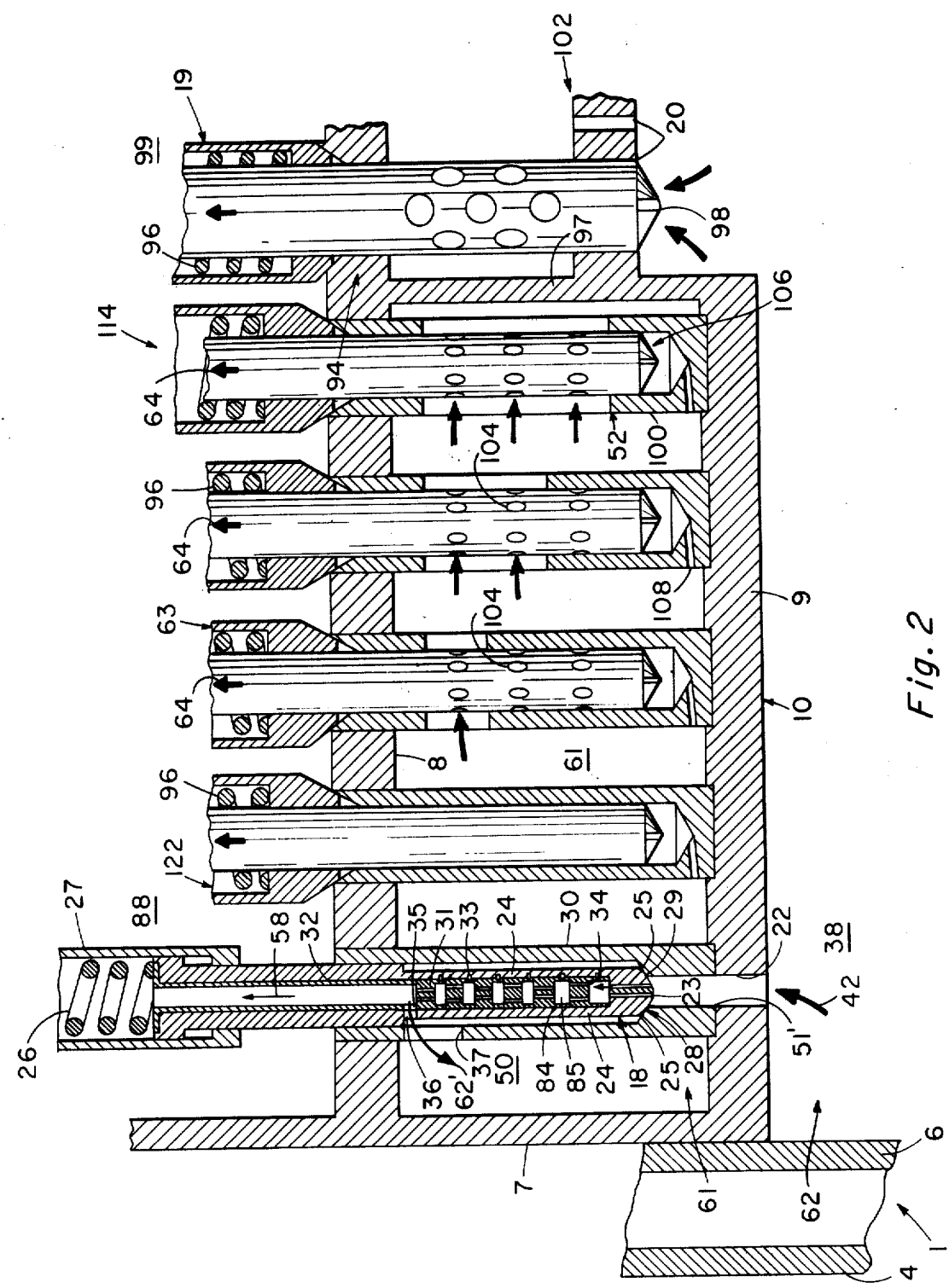
FIG. 2 is a partial cross-section of FIG. 1 through II—II illustrating one embodiment of this invention.

Referring to FIGS. 1 and 2, there is shown liquid metal fast breeder reactor 1 consisting of a reactive core 2 located within a pressure vessel 4 and a core barrel 6. The outer wall 7 of core 2 terminates at the lower end thereof in a pair of horizontally disposed plates 8, and 9 forming a lower plate assembly 10, which is designed to support the lower ends of the various fuel assemblies, breeder assemblies, and restraint assemblies, as described below.

Core 2 of reactor 1 is divided into several zones as defined by the darkened lines A and B shown in FIG. 1. In the region located outside of line A are the restraint assemblies 18 and reflector assemblies, whereas in the region located between lines A and B are located the radial blanket fuel assemblies or breeder assemblies, and in the region inside of line B are located the fuel assemblies 19. As is understood in the art, and it is not a part of the invention, these various zones may be varied in accordance with selected design goals.

Referring more particularly to FIG. 2, as indicated by arrows, liquid metal coolant is flowing upwardly into vessel 4 and it is a principal purpose of this invention to deliver the coolant into and through plates 8 and 9 into the various assemblies making up core 2 to obtain proper cooling. For this purpose, it will be seen that fuel assemblies 19 extend through plate 8 so that the coolant enters openings 20 and flows upwardly therethrough to transfer the heat generated out of reactor 1. It is also necessary to obtain cooling of the breeder or blanket assemblies. However, far less heat must be removed so that less coolant is required in these outer zones of the reactor. In addition, the cooling requirements are different depending on the location of particular assemblies and over a period of time, as mentioned above, due to the conversion of fertile material to fissile material, substantially more cooling is required in the outer regions of the core over a period of operation.

In order to avoid overcooling of some of these assemblies at the beginning of reactor operation to insure proper cooling later, provision is made not only to provide an adequate pressure drop as the coolant enters the outer zones of core 2, but also to permit increased coolant flow as cooling requirements increase.

Referring back to FIG. 2, it will be seen that each restraint assembly 18 is provided with nozzle opening inlets 23 to permit coolant to enter. Each restraint assembly 18 consists of a tubular nozzle 24 that is loaded against seal 25 by helical spring 26, the spring being held under compression in a selectively removable assembly by a cylindrical support 27. The seal 25, comprises a ball 28 on the lower end of the nozzle 24 and a cone 29 near the lower end of cylindrical retainer tube 30, which supports the restraint assembly 18 for insertion through plate 8 for the receipt and transport of a liquid metal flow from opening 22, and the throttling of this flow by orifice plates 31. These orifice plates are loaded by spring 26, which transmits its stored energy to load the plates 31 through sleeve 32. The orifice plates are keyed by key 33 to nozzle 24 to prevent rotation. Thus, the staggered arrangement of the apertures 34 in the plates 31 is maintained to prevent neutron streaming therethrough, as seen from FIGS. 2 and 2a. Also, it will be seen that liquid metal flows through opening 22, through inlets 23 at the bottom of nozzle 24, and through the apertures 34 in orifice plates 31. After passing through the last orifice plate 31, the liquid metal flow splits into an axial fluid stream portion, which passes out the top of the restraint assembly, and a radial fluid stream portion, which flows through hole 35 in sleeve 32, hole 36 in nozzle 24, and hole 37 in cylindrical retainer tube 30. As shown in FIG. 2, these holes line up with each other in a direction away from the center of the core of the reactor to obtain a flow reversal in plenum 50 for uniformly flowing the coolant from plenum 50 to and through the radial blanket fuel assemblies.

It should be noted that not every restraint assembly location is provided with a restraint assembly 18. When the core is freshly fueled, less coolant is required in the region outside of line B. Therefore, some of the locations are supplied with plugs to prevent coolant from entering.

A typical such plug 59 is illustrated in FIG. 3. The bottom of plug 59 forms with retainer tube 30 a ball and cone seal, like the seal 25 described above for the bottom of the restraint assemblies 18. Since the plug 59 does not have orifice plates 31, the plug is loaded directly by spring 26 to seal the plug against retainer tube 30 and no sleeve 32 is required inside the plug. Since the plug does not communicate fluid flow to plenum 50, the side wall of the plug does not have a hole in the side thereof. However, a small hole 60 up through the center of the plug provides for cooling the same. Advantageously, the plug 59 is dimensioned like restraint assemblies 18 to fit into the retainer tube 30 in plate 8 above an opening 22 in the plate 9, which divides the low pressure region 61 of the fuel assembly 63 from the high pressure region 62 below the divider plate 9.

In a typical sequence, it is advantageous in accordance with this invention, to match the position and flow of the coolant 38 with the power produced in the individual radial blanket fuel assemblies 63 at a given point of time, and periodically to change this matching as the reactor ages. To this end, selected plugs 59 are removed and replaced by restraint assemblies 18, which are selectively inserted in plenum chamber 50 for increasing the flow of the coolant 38 in specific portions of the zone inside line A in FIG. 1 relative to specific identical and shuffleable radial blanket fuel assemblies 63 of the type having fixed position "trim" slots 52. Thus, the coolant 38 will be matched with the respective cooling requirements of these identical, shuffleable radial blanket fuel assemblies so as to prevent severe overcooling thereof. Moreover, these selectively insertable restraint assemblies 18 provide inlet means for matching the flow and position of the coolant with the radial blanket fuel assemblies as the reactor ages. To this end, each selectively added restraint assembly 18 splits a coolant stream 42 into an axially flowing stream portion and a radially flowing fluid stream portion that is received and transported by the identical shuffleable radial blanket fuel assemblies for cooling the same. The radial stream portion is indicated by arrow 62' to show its passage from restraint assembly 18 through exit hole 36 in the side thereof and a hole 35 in the side of the sleeve 32 for holding down the orifice plates 31 thereof so that holes 35 and 36 line up with hole 37 in retainer tube 30 for assembly 18.

In the preferred embodiment that is illustrated in FIG. 2, the exit holes 35 and 36 are at the top of the last orifice plate 31 and are directed radially outwardly from the center of the reactor so as to cause a reversal of the flow direction in plenum 50 toward the radial blanket fuel assemblies to insure the proper flow and cooling therein.

The restraint assemblies 18, are selectively inserted in a cylindrical retainer tube 30 located between plates 8 and 9 in plenum chamber 50 and above duct 51' formed by retainer tube 30 so as to receive a fluid stream 42 from opening 22 in the divider plate 9, which separates the high pressure region 62 from the low pressure region 61. Thereupon the restraint assembly 18 receives and transports the coolant stream 42 and divides the same into an axial stream portion 58 and a radial stream portion 62', which flows through hole 36 in nozzle 24, hole 35 in sleeve 32, and hole 37 in the retainer tube 30 for cooling the radial blanket fuel assemblies 63. To this end, the restraint assembly 18 replaces a low axial flow plug 59, such as shown in FIG. 3, which can be removed and replaced during shuffling of the radial blanket fuel assemblies 63 to increase the number and/or the coolant streams 42. Thus, restraint assemblies 18 are inserted by position to increase the coolant flow in the streams 42 to selected of the shuffled radial blanket fuel assemblies, since the former divert radially a portion of the flowing liquid metal coolant 38 in these streams 42 toward the periphery thereof, i.e., toward the periphery of the respective streams 42 provided by removing the plugs and replacing the assemblies 18. Also, the restraint assemblies 18 separate these added or increased flow streams 42 into axially flowing fluid stream portions 58 and radially flowing annular fluid stream portions 62' that are received and transported into axial streams 64 parallel to the streams 42 by the radial blanket fuel assemblies 63, thus selectively to cool the same.

Coolant flow into the plenum may be easily increased to the desired throttling by selectively inserting and/or replacing several assemblies 18 with a refueling machine, which as it is known in the art is not described in more detail herein. In this regard, the inserted assemblies 18 have greater flow than the plugs 59 or assemblies that were removed and replaced.

The staggered arrangement of the throttling disc shaped orifice plates 31 shown in FIG. 2a rapidly mounts them in mating relation with each other and each of the respective restraint assemblies 18. To this end, the plates 31 have a shoulder 84 that sits on top of a lower plate 31 to form a mixing region 85, while a key 33 prevents them from rotating. In the best mode contemplated, key 33 is wedged in mating relation in opposing slots in the outside of each plate 31 and in the inside of the cylindrical tube formed by nozzle 24. As is understood from the drawings, the annular orifice plates 31 have staggered apertures 34, which block neutron streaming and provide a desired throttling of fluid stream 42.

The lower portion of the nozzle of the restraint assembly 18 is sealed by a seal 25 against the retainer tube 30 above an opening 22. This seal is accomplished by a ball 28 and a cone 29 loaded with a helical spring 26 located in support 27 above an upper circular plate 8 that makes up a portion of the plenum pressure boundary. The spring 26 also loads the plates 31 through sleeve 32 so that the difference in pressure between the low pressure plenum chamber 50 and the region 88 above the plenum chamber 50 is sufficiently low that a seal at the upper plate 8 is not required. A reasonably tight clearance between the nozzle and the upper plate is adequate to control bypass leakage.

The radial blanket assemblies, reflector assemblies, and fuel assemblies are sealed at the upper plate 8, which comprises part of the lower plate assembly and the core support structure 94. Springs 96 allow relative motion caused by thermal expansion and irradiation induced swelling of the reflector assemblies 122, and fuel assemblies 19 in the core, as well as in the radial blanket assemblies 63.

The divider 97 of the plate 9 separates the high pressure entrance 98 to the core region 99 from the low pressure plenum region 50 which supplies the coolant to the radial blanket fuel assemblies 63. Multiple inlet openings 22 (e.g., 12 to 24) to the low pressure plenum chamber 50 provide for a redundancy in the coolant flow should one or more of the inlet openings 22 become restricted with a foreign object.

Location orificing in the radial blanket fuel assemblies 63 is provided by slot-shaped "trim" orifice slots 52 located in sleeve 100 that makes up part of the lower support structure 102. These slots are aligned with small holes 104 in lower nozzles 106 of the radial blanket fuel assemblies 63. Each radial blanket fuel assembly has, for example, 18 holes located at three elevations and at 60° intervals circumferentially. A small drain hole 108 is also provided in the bottom of the nozzle 106. The slots 52 in the surrounding sleeves 100 are dimensioned to expose one, two, or three levels of holes 104 in the nozzle 106 as the assemblies are shuffled from location to location. The slots 52 are provided at 60° or 120° intervals in the circumferential direction. This allows for significant variation in the coolant flow depending on the radial location provided by the described shuffling of the radial blanket fuel assemblies. Although a standard design for lower nozzles 106 of the radial blanket fuel assemblies 63 is initially used, it will be understood that later adjustments can be accomplished by changing the size of holes 104 in the replacement assembly nozzles 106 and/or the desired downstream outlets 114 in the radial blanket fuel assemblies 63.

In operation the low pressure plenum 50 supplies the coolant 38 to all the described radial blanket fuel assemblies 63 that are interchangeable from the restraint assemblies 18, as well as to the reflector assemblies 122. The described increased flow restraint assemblies 18 are selectively inserted during a normal refueling period, which occurs, for example, every six months to a year. This is a sufficiently short period to provide the described upstream coolant flow throttling as well as the desired flow in the downstream outlets 114 of the radial blanket fuel assemblies 63, to be closely adjusted for power shifts. Moreover, selected assemblies 63 are replaced periodically anyway due to irradiation damage.

In one example, the fact that coolant 38 for 166 radial blanket fuel assemblies 63 initially enters the supply plenum chamber 50 through openings 22 and ducts 51' connected to a much smaller number (12–14) of restraint assemblies 18, makes adequate pressure breakdown possible in a reasonable amount of space in each assembly. In this regard, it will be understood that the throttling provided by these assemblies 18 and the radial blanket fuel assemblies 63 depends on the cross-sectional areas and sizes thereof, which can selectively vary, e.g., by increasing them for selectively varying the flows and fluid streams produced thereby. Advantageously, however, the arrangement and cooperation thereof maintain and provide for the larger streams 42 to be broken down into a plurality of smaller streams to provide the desired throttling in each of the streams 58, 62' and 64.

While restraint assemblies 18 having a predetermined number of annular orifice plates 31 can be used for throttling the streams 42, it will be understood that this number of these disc plates 31 can be varied for adjusting the radial flow therefrom and the throttling thereof. Also, the size of the apertures 34 in the orifice plates 31 can be changed for adjusting the axial and radial flows therefrom and the throttling thereof, i.e., for adjusting the axial fluid stream portions 58 and the radial fluid stream portions 62'.

What is claimed is:

1. In a nuclear reactor core (2) including core components, comprising a lower grid plate (9) with axial openings (22) therethrough separating zones (62 and 61) of high and low coolant (38) pressure, an upper grid plate 8 with axial openings therethrough in alignment with the openings in the lower grid plate, a plurality of tubular first, second and third retainers (30) in the low pressure zone depending vertically from the upper grid plate, depending vertically upon the lower grid plate, interposed between the two plates, and passing axially vertically upwardly through the upper grid plate in said low pressure zone;

said tubular first retainers having a top opening aligned axially with openings through the upper and lower grid plates, and the tubular first, second and third retainers containing specific core components (59, 18, 122 and 63) that are adapted to define coolant flows through their tubular retainers, all of said openings in said lower grid plate being axially aligned with said openings in said tubular first retainers;

the specific core components comprising a plurality of hollow, tubular, longitudinally, axially and vertically extending plugs (59) and restraint assemblies (18) supported by the tubular first retainers, reflector assemblies (122) supported by the tubular second retainers, and blanket fuel assemblies (63) supported by the third tubular retainers;

the blanket fuel assemblies being replaceable and interchangeable with each other in the tubular third retainers;

the specific core components having coolant inlet portions, and the coolant inlet portions (23 and 60) in the plugs and first restraint assemblies being disposed to receive coolant longitudinally axially, vertically from an opening in the lower grid plate to transport coolant in a flow axially through the low pressure zone between the upper and lower grid plates, said low pressure zone being divided into two separate and non-fluid communicating regions, one of said regions containing said tubular first, second and third retainers and the other of said regions containing all of the fissile fuel assemblies of the core;

the improved combination, comprising:

a. tubular first retainers having side wall openings (37) communicating with the low pressure zone between the grid plates for receiving and transporting a portion of said axially flowing coolant radially horizontally outwardly in a first direction;

b. tubular third retainers having side wall openings (37) communicating with the low pressure zone between the grid plates for receiving and transporting coolant flow radially horizontally inwardly in a second direction;

c. the second and third tubular retainers having drain holes (108) communicating with the low pressure zone between the grid plates;

d. blanket fuel assemblies having side wall openings (104) communicating with the low pressure zone between the grid plates for receiving and transporting coolant flow radially horizontally inwardly in said second direction and communicating with the side wall openings in the tubular third retainers; and e. restraint assemblies having side wall openings (35) communicating with the side wall openings (37) in the tubular first retainers;

the plugs and reflector assemblies differing from the tubular first and third retainers and the blanket fuel assemblies in that the plugs and reflector assemblies permit only an axial vertical flow of coolant therethrough to define said flow in their respective tubular first and second retainers, the restraint assemblies and blanket fuel assemblies permitting and defining both axial vertical and radial horizontal coolant flow in their respective tubular first and third retainers, and the radial horizontal outward flow through the restraint assemblies and the first tubular retainers communicating with the radial horizontal inward flow through the third tubular retainers and the blanket fuel assemblies.

2. The apparatus of claim 1 in which the blanket fuel assemblies (63) are interchangeable and the plugs (59), and the restraint assemblies (18) are interchangeable to vary the number and position of the radial streams of the coolant (38) when the core (2) is in operation by decreasing the number of the plugs (59) and correspondingly increasing the number of the restraint assemblies (18) when the core (2) is shut down.

3. The apparatus of claim 2 in which the restraint assemblies (18) have orifice plates (31) forming throttling means for the axial flow of the coolant (38) therein, a portion of said axial flow communicating with holes (35 and 108) and trim slots (52) in the wall of the blanket fuel assemblies, and holes (104) in the blanket fuel assemblies (63).

4. The apparatus of claim 3 in which the orifice plates (31) have keys (33) contained in the inside wall of the tubular retainers (30) for preventing rotation of the orifice plates (31).

5. The apparatus of claim 4 in which the orifice plates (31) are loaded by means, comprising springs (26) and sleeves (32) having holes (35) communicating with the holes (36 and 37) in the restraint assemblies (18) and the tubular retainers (30) for receiving and transporting the radial flow of the coolant (38) therethrough.

* * * * *